United States Patent
Hoffman et al.

(10) Patent No.: US 9,909,811 B1
(45) Date of Patent: *Mar. 6, 2018

(54) POOL, LARGE TANK, OR POND HUB EXCHANGER

(71) Applicant: Hydra Heating Industries, LLC, Atlanta, GA (US)

(72) Inventors: Michael Hoffman, Atlanta, GA (US); Jeannot Morin, Intervale, NH (US)

(73) Assignee: Hydra Heating Industries, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,000

(22) Filed: Mar. 3, 2016

Related U.S. Application Data

(60) Provisional application No. 62/127,562, filed on Mar. 3, 2015.

(51) Int. Cl.
| | | |
|---|---|---|
| *F28D 1/02* | (2006.01) | |
| *F28C 3/04* | (2006.01) | |
| *F28F 9/013* | (2006.01) | |

(52) U.S. Cl.
CPC ............ *F28D 1/0213* (2013.01); *F28C 3/04* (2013.01); *F28D 1/022* (2013.01); *F28F 9/013* (2013.01)

(58) Field of Classification Search
CPC .......... F28D 1/0213; F28D 1/022; F28C 3/04
See application file for complete search history.

(56) References Cited

U.S. PATENT DOCUMENTS

| | | | | |
|---|---|---|---|---|
| 1,614,430 A | * | 1/1927 | Mart ..................... | A01G 25/00 239/267 |
| 1,821,229 A | * | 9/1931 | Mullett ................ | A47K 3/283 137/602 |
| 2,640,686 A | * | 6/1953 | Brown, Jr. ............. | F23K 5/20 165/108 |
| 2,767,020 A | * | 10/1956 | Knowles ................ | C02F 3/043 210/150 |
| 2,965,360 A | * | 12/1960 | Brown, Jr. ........... | F28D 1/0213 165/108 |
| 2,973,944 A | * | 3/1961 | Etter .................... | F28D 1/0213 165/109.1 |

(Continued)

OTHER PUBLICATIONS

International Search Report and Written Opinion, dated Mar. 26, 2015 for PCT/US2014/063468.

*Primary Examiner* — Janie Loeppke
(74) *Attorney, Agent, or Firm* — Thomas Horstemeyer, LLP

(57) ABSTRACT

An exchanger for a pool, large storage tank, or pond is described herein. In one embodiment, the exchanger includes a diffuser hub, exchanger extension arms that extend radially outward from the diffuser hub, one or more exchanger rings that intersect with the heat exchanger extension arms, and a fill tube that extends to the diffuser hub. One or both of the heat exchanger arms and/or the exchanger rings include fluid apertures that direct fluid into the pool. Fluid pumped into the fill tube may flow through into the diffuser, through the exchanger extension arms and/or the one or more exchanger rings, and out through the fluid apertures at various locations into the pool. As such, heated fluid, or fluid to be mixed, for example, may be more evenly and quickly distributed into the pool.

15 Claims, 11 Drawing Sheets

(56) References Cited

U.S. PATENT DOCUMENTS

| | | | |
|---|---|---|---|
| 3,595,308 A * | 7/1971 | Durdin | F28D 1/0213 |
| | | | 165/104.31 |
| 3,804,160 A * | 4/1974 | Kendrick | C01B 17/806 |
| | | | 165/145 |
| 4,101,987 A | 7/1978 | Gagnon | |
| 4,502,392 A | 3/1985 | Rosenberger | |
| 4,569,805 A | 2/1986 | Hume et al. | |
| 4,893,362 A | 1/1990 | Murphy | |
| 5,320,163 A * | 6/1994 | Stoodley | A01J 9/04 |
| | | | 165/132 |
| 6,419,009 B1 | 7/2002 | Gregory | |
| 7,797,770 B2 | 9/2010 | Lau | |
| 8,387,805 B2 | 3/2013 | Olivier | |
| 8,631,828 B1 * | 1/2014 | Ward | B01F 5/0268 |
| | | | 137/561 A |
| 9,551,206 B2 * | 1/2017 | Hoffman | F28D 1/0213 |
| 2005/0211802 A1 * | 9/2005 | Newton | F16L 41/03 |
| | | | 239/548 |
| 2010/0025407 A1 | 2/2010 | Benson | |
| 2013/0150268 A1 | 6/2013 | Oldham | |

\* cited by examiner

POOL, LARGE TANK, OR POND HUB EXCHANGER

CROSS-REFERENCE TO RELATED APPLICATIONS

This application claims the benefit of U.S. Provisional Application No. 62/127,562, filed Mar. 3, 2015, the entire contents of which is hereby incorporated herein by reference.

BACKGROUND

Pools or ponds may be embodied in a variety of configurations and sizes. Some pools are round with metal segmented sides, while others may be formed having oblong, crescent, circular, oval, half-moon, semi-circle or irregular rounded shapes. Still others may have rectangular, square, rounded square, trilateral, quadrilateral, or other multiple-sided, regular or irregular shapes. The sides may be rigid or collapsible, temporary or permanent. The pools or ponds may be above ground, underground, or in ground.

Such pools or ponds may be used to provide storage for fluid at various locations, such as at drilling sites for oil and gas wells, manufacturing facilities, warehouses, user facilities (e.g., biodiesel storage for farms), trans loading facilities, municipal and public works locations, etc.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
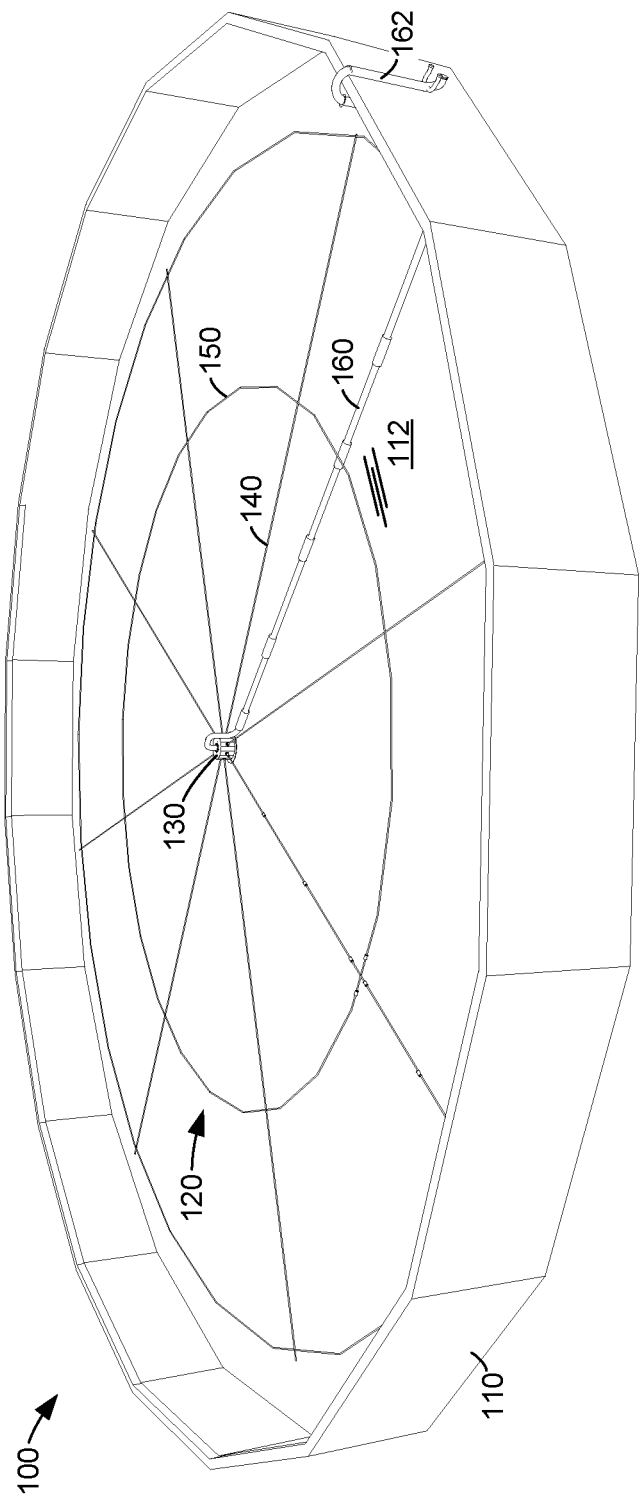
FIG. 1 illustrates a perspective view of a pool with an example exchanger according to one embodiment of the present disclosure.

As noted above, pools or tanks may be used to provide storage for fluid at various locations such as drilling sites for oil and gas wells, for example. A pool may be erected at a location proximate to a drilling site, for example, and used to store water or other fluids used in drilling processes. Once erected, a pool can be filled with fluid for storage, processing, and dispensing. Examples of fluids that may be stored in a pool include fracking liquids, drilling mud, fluids from environmental cleanup, water, brine, etc. As used herein, the term "fluid" includes any material or composition of materials of suitable viscosity to flow into and/or out of a pool, with or without pumping. Thus, the term "fluid" is intended to include any flowing mixture, suspension, slurry, or combination of materials.

Depending upon the needs at the site, it may be desirable or necessary to heat the fluid stored in a pool. For example, in hydraulic fracturing, heated fluid is pumped into wells to stimulate the wells for the removal of oil and/or gas deposits. However, because of the size of the pool and the volume of fluid that may be stored in the pool, it may be difficult to evenly disperse or diffuse heated fluid throughout the pool if the fluid is merely fed into a fill tube at the pool. Further, depending upon the needs at the site, it may be desirable or necessary to mix the fluid stored in a pool with another material. For example, in diesel exhaust fluid, urea is mixed with water. Without an exchanger as described herein, it may be difficult to evenly disperse or diffuse and mix fluid throughout the pool if the fluid is merely fed into a fill tube at the pool.

If fluid is circulated from the pool, heated by a fluid heater, and then fed back into a fill tube of the pool, the fluid surrounding the fill tube may become relatively warmer in the pool while fluid further away from the fill tube may remain relatively cooler. This manner of injecting a heated fluid into the pool is, thus, a relatively inefficient and ineffective method of heating the fluid in the pool, wasting time and resources.

In the context described above, a heat exchanger is described herein. The heat exchanger may be relied upon in a pool, for example, to more evenly distribute and diffuse fluid into the pool. When a heated fluid is pumped into the pool, the heat exchanger helps to more evenly distribute and diffuse the heated fluid into the pool. Overall, the volume of fluid in the pool may be more evenly and quickly brought to a desired temperature when using the heat exchanger. Further, it may require less fuel to heat the fluid in the pool. Thus, the heat exchanger may be relied upon in a pool to save time and resources when heating fracking liquids, for example, or other fluids that may be stored in the pool. The same principles apply when using the exchanger for mixing fluids. The exchanger may also be used to promote or reduce phase change in fluids, to cool fluids or gasses that are too hot, and/or to heat phase changed materials (e.g. turning ice to water).

As described in further detail below, the heat exchanger includes a diffuser hub located proximate to a center of a pool, heat exchanger extension arms that extend radially outward from the diffuser hub toward a wall of the pool, one or more heat exchanger rings that intersect with the heat exchanger extension arms, and a fill tube that extends from the pool wall to the diffuser hub. In one aspect of the embodiments, one or both of the heat exchanger arms and/or the one or more exchanger rings include fluid apertures that direct fluid into the pool. Further, in one embodiment, the diffuser hub includes a top, a bottom, a padded cover surrounding a bottom side of the bottom, an inlet flange attached to the top, one or more side walls that surround an interior space formed between the top and the bottom, one or more outlet reducers extending from the one or more side walls, one or more outlet hoses connected to the one or more outlet reducers, and one or more diverters. The one or more hoses may be relied upon to secure the heat exchanger arms in fluid communication with the interior space of the diffuser hub.

Turning now to the drawings, various structural and functional aspects of the embodiments are described in further detail.

FIG. 1 illustrates a perspective view of a pool 100 with an example exchanger 120 according to one embodiment of the present disclosure. The pool 100 includes pool walls 110 and pool floor 112. The pool walls 110 may be formed from steel or any other material suitable for holding and retaining fluid in the pool 100. When erected, the pool walls 110 may be installed over leveled earth or other substrata as required by the pool installer and manufacturer. Once the pool walls 110 are installed, a liner may be inserted into the pool 100 to help retain water in the pool 100. Thus, the pool floor 112 may comprise a liner placed over leveled earth or other substrata as the pool erector requires or uses.

The exchanger 120 may be referred to as a heat exchanger because it may be relied upon to evenly distribute or disperse heated fluid throughout the pool 100. It should be appreciated, however, that the exchanger 120 may be relied upon to evenly distribute any type of fluid throughout the pool 100. For example, the exchanger 120 may be relied upon to evenly distribute or disperse a brine solution having a higher concentration of salt into fresh water stored within the pool 100. Further, it should be appreciated that the pool 100 illustrated in FIG. 1 is provided by way of example only. In other words, the embodiments of exchangers described herein may be used in any type of storage pool, and the pool 100 is only representative of one type of storage pool in which the exchangers may be used.

The exchanger 120 in FIG. 1 includes a diffuser hub 130 located proximate to a center of the pool 100, exchanger extension arms 140 that extend radially outward from the diffuser hub 130 toward the pool walls 110, one or more exchanger rings 150 that intersect with the exchanger extension arms 140, and a fill tube 160 that extends from the pool walls 110 to the diffuser hub 130. Among embodiments, the exchanger 120 may include any number of exchanger extension arms 140 arranged in various positions and/or locations within the pool 100 and any number of exchanger rings 150 arranged in various positions and/or locations within the pool 100. While not shown, valves or orifices may be used to control fluid flow through the exchanger arms 140 and/or the exchanger rings 150. In this way, some of the exchanger arms 140 and/or the exchanger rings 150 may have reduced flow, others may be cut off, and others may have increased flow.

Figure 4:
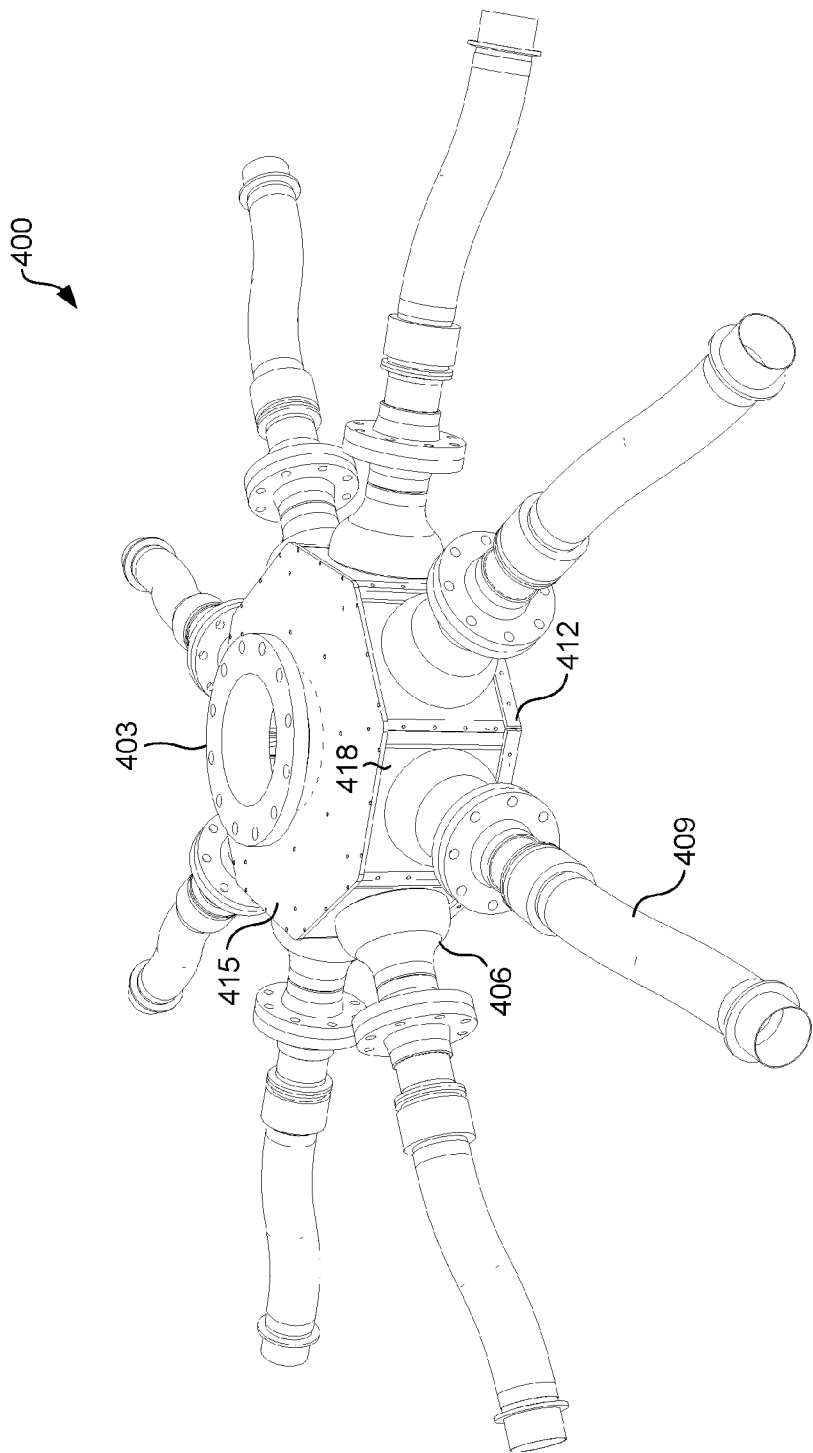
FIG. 4 illustrates a perspective view of a diffuser hub of the exchangers in FIGS. 1-3 according to one embodiment of the present disclosure.
Figure 5:
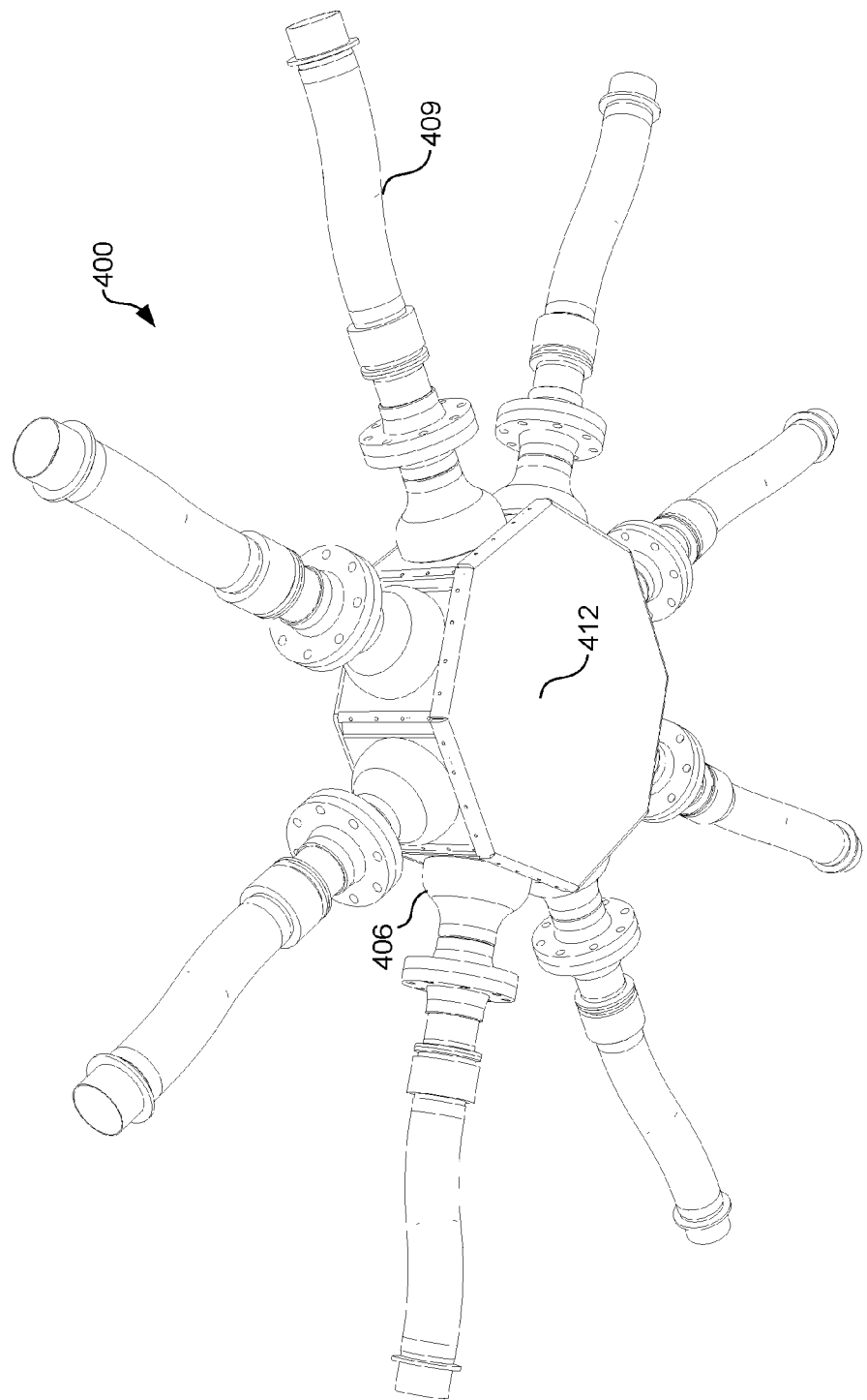
FIG. 5 illustrates a bottom perspective view of the diffuser hub of the exchangers in FIGS. 1-3 according to one embodiment of the present disclosure.
Figure 6:
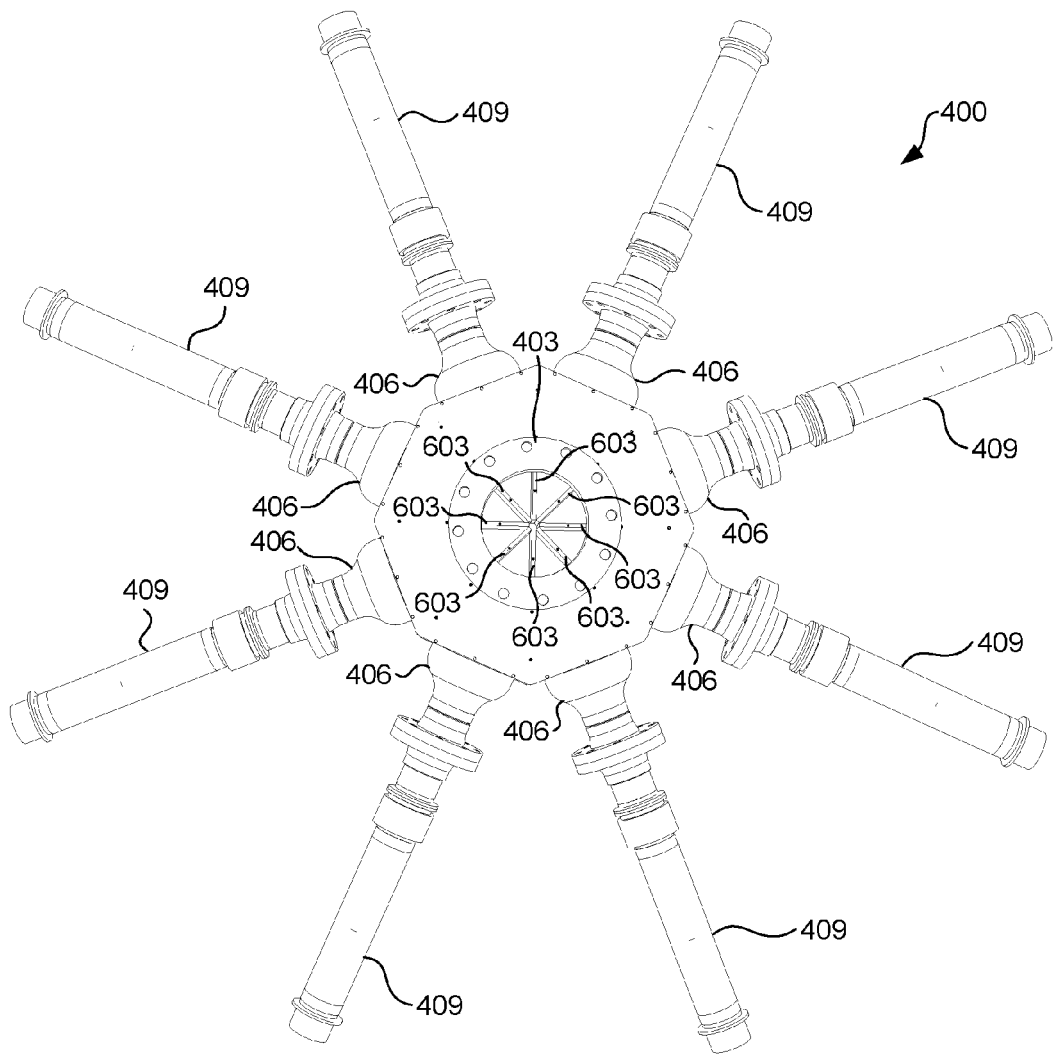
FIG. 6 illustrates a top view of a diffuser hub of the exchangers in FIGS. 1-3 according to one embodiment of the present disclosure.
Figure 7:
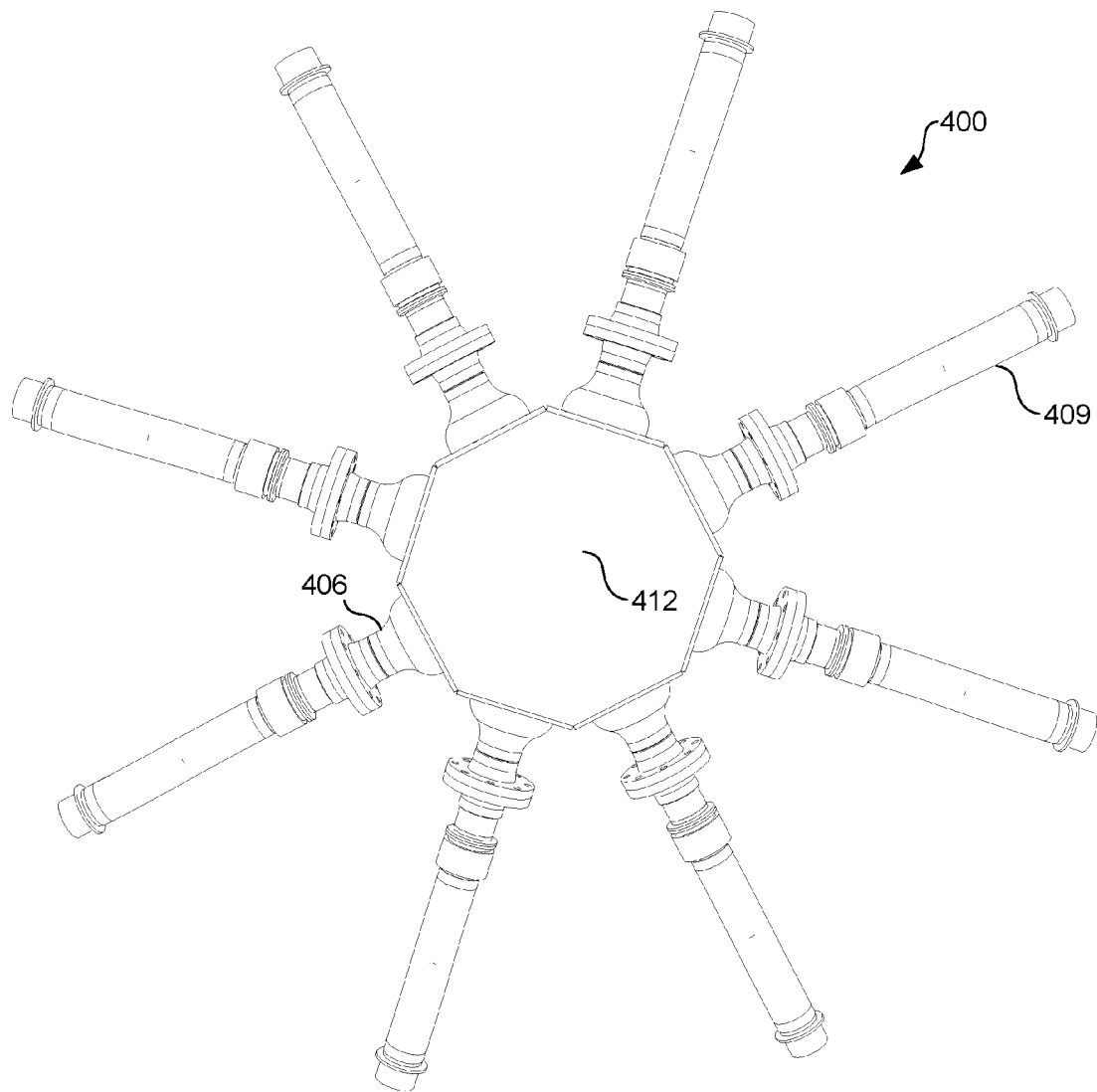
FIG. 7 illustrates a bottom view of the diffuser hub of the exchangers in FIGS. 1-3 according to one embodiment of the present disclosure.
Figure 8:
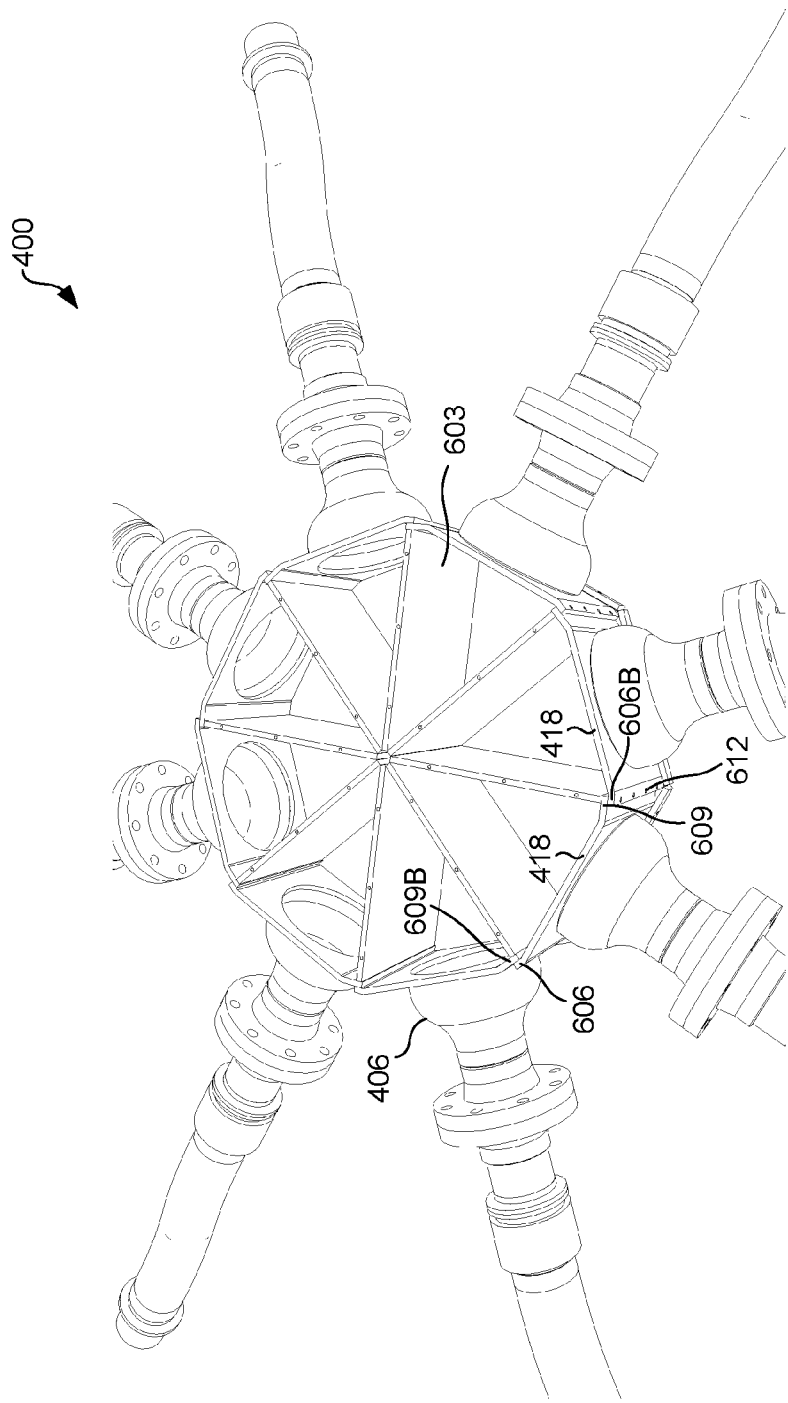
FIG. 8 illustrates a perspective sectional view of the diffuser hub of the exchangers in FIGS. 1-3 according to one embodiment of the present disclosure.
Figure 9:
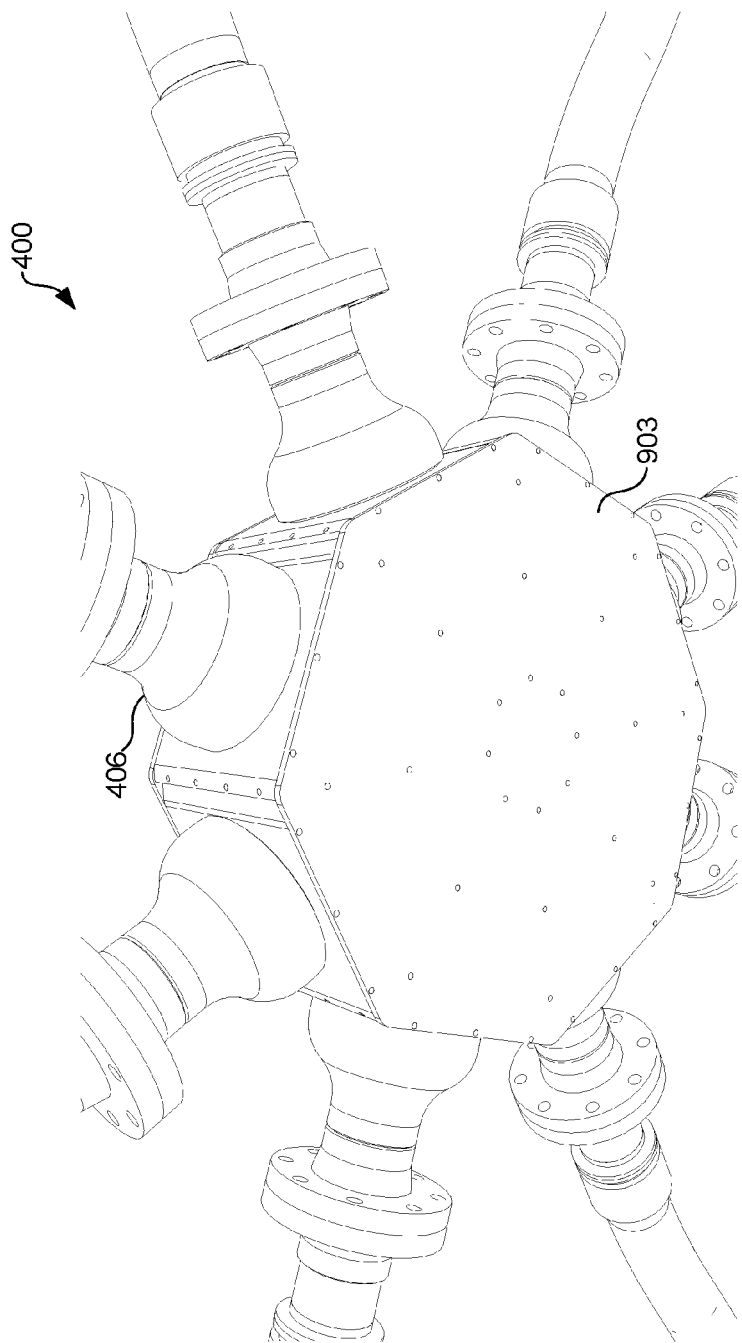
FIG. 9 illustrates a bottom perspective sectional view of the diffuser hub of the exchangers in FIGS. 1-3 according to one embodiment of the present disclosure.
Figure 10:
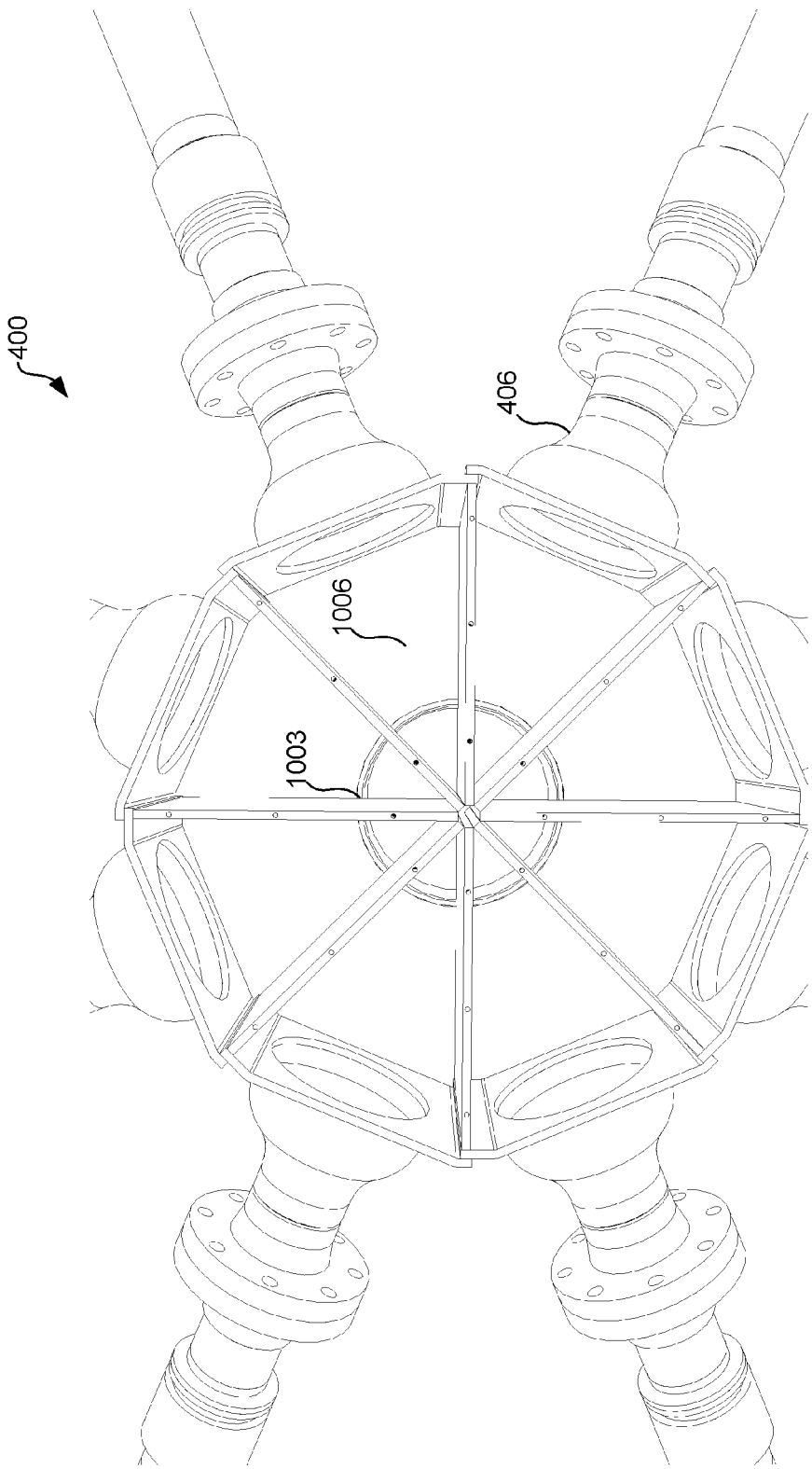
FIG. 10 illustrates a bottom sectional view of the diffuser hub of the exchangers in FIGS. 1-3 according to one embodiment of the present disclosure.
Figure 11:
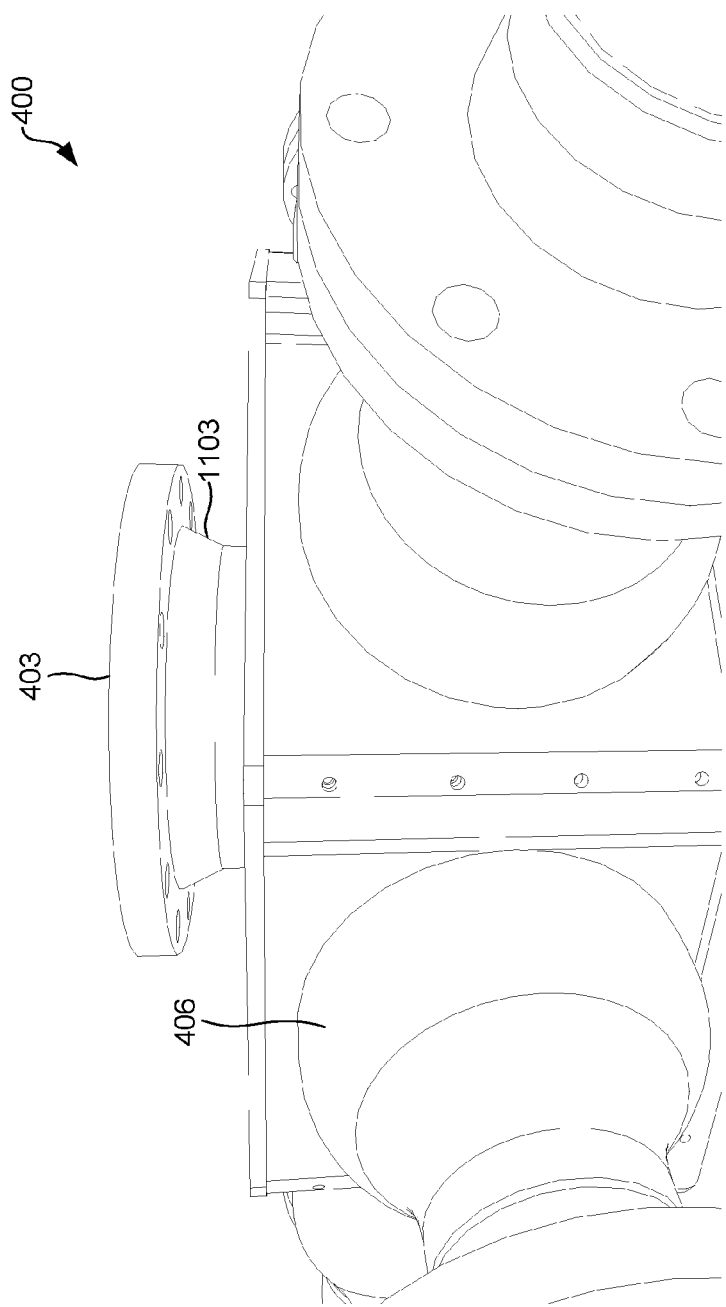
FIG. 11 illustrates a bottom perspective sectional view of the diffuser hub of the exchangers in FIGS. 1-3 according to one embodiment of the present disclosure.

In one aspect of the embodiments, one or both of the exchanger arms 140 and/or the exchanger rings 150 include fluid apertures that direct fluid into the pool 100. Further, as described in additional detail below with reference to FIGS. 4 and 5, the diffuser hub 130 includes a cylindrical housing that surrounds an interior space, a fill tube inlet through the cylindrical housing, a cylindrical diffuser ring that extends within the interior space of the diffuser hub 130, and one or more flanges, cam locks, welds, welded butt joints or other means of penetrating the diffuser hub 130 and attaching radiant pipes or tubes in sides of the cylindrical housing of the diffuser hub 130. The flanges may be relied upon to secure the exchanger arms 140 in fluid communication with the interior space of the diffuser hub 130.

As also illustrated in FIG. 1, the exchanger 120 includes a snorkel 162 that extends from outside the pool 100, over the pool wall 110, and into an interior fluid storage space of the pool 100. The snorkel 162 may be embodied as a pipe or tube for directing fluid and be connected in fluid communication with the fill tube 160. In various embodiments, the snorkel 162 may include one or more inlet openings of various sizes for providing a supply of fluid to the pool 100. The inlet openings of the snorkel 162 may be connected to pipes, hoses, or tubes of various diameters. The pipes or hoses may be of rigid construction or collapsible. Such collapsible hoses may be embodied as flat hoses, such as fire hoses, etc.

The exchanger extension arms 140 and exchanger rings 150 may be embodied as straight or curved tubes or pipes formed from aluminum, carbon, stainless or other metals, metallic alloys, plastic, or any other material suitable for the application of directing fluid. In other embodiments, the exchanger extension arms 140 and exchanger rings 150 may be embodied as hoses, such as flat hoses, for example, formed from a combination of nylon fabric, rubber, etc. Although being rigid in some embodiments, the exchanger extension arms 140 and exchanger rings 150 may be mounted in place using pipe sleeves or buoys to protect the floor of the pool or pond, for example. The exchanger extension arms 140 and exchanger rings 150 may be mechanically secured together in fluid communication with each other using one or more joints or joining members. The joints may include male-to-female threaded connections, flanges, etc., to join and secure the exchanger extension arms 140 and exchanger rings 150 together. As necessary, fastening means, such as bolts and nuts, locking pins, epoxy, various glues, compression joints, etc. may also be relied upon to join and secure the exchanger extension arms 140 and exchanger rings 150 together. It also should be appreciated that exchanger extension arms 140 and exchanger rings 150 may be formed from several smaller segments of tubes. In some embodiments, one or more gaskets may be placed between segments of the exchanger extension arms 140 and exchanger rings 150, to help prevent fluid from leaking between junctures in the exchanger 120. Valves, orifices or other devices may be used to reduce or increase flow through the extension arms as needed for the particular use at hand. For example, an irregular shape may require less flow in shorter exchanger arms and more flow in longer exchanger arms.

In operation, fluid may be pumped into the snorkel 162 and, thus, into the fill tube 160 of the exchanger 120. In turn, the fluid will be directed into the diffuser hub 130 toward the center of the pool 100. From the diffuser hub 130, the fluid will be directed into the exchanger extension arms 156 and/or the exchanger rings 150 and, ultimately, out from fluid apertures in the exchanger extension arms 156 and/or the exchanger rings 150. The fluid apertures may be positioned relatively evenly across the exchanger extension arms 156 and/or the exchanger rings 150 and direct fluid into the pool 100 at various spaced-apart locations. As such, heated fluid, for example, may be more evenly distributed into the pool 100. The fluid apertures may be sized regularly or they may be smaller or larger as is useful for the operation of the exchanger 120. For example, smaller apertures may be located closer to the diffuser hub 130 and larger holes may be located further away from the diffuser hub 130.

FIG. 2A illustrates a closer perspective view of a portion of the example exchanger 120 in FIG. 1 according to one embodiment of the present disclosure. In FIG. 2A, the path or route of the fill tube 160 within the pool 100 is shown as tracking or extending along the pool floor 112, routing up along a side of the diffuser hub 130, and being connected to a fill tube inlet at the top of the diffuser hub 130. In other embodiments, such as that described below with reference to FIG. 3, the fill tube 160 may be routed in alternative ways.

Figure 2:
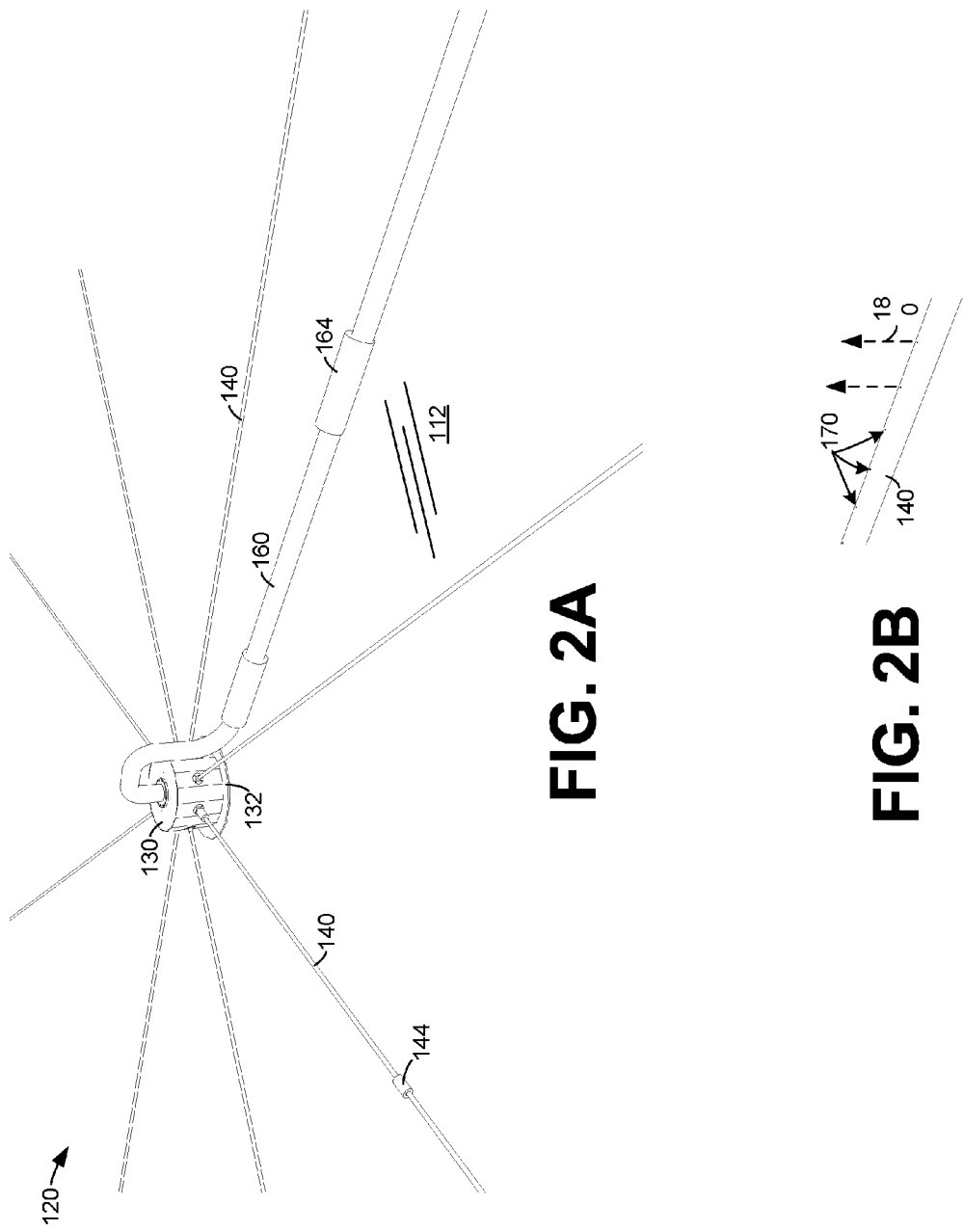
FIG. 2A illustrates a closer perspective view of a portion of the example exchanger in FIG. 1 according to one embodiment of the present disclosure.
FIG. 2B illustrates a closer perspective view of an exchanger extension arm of the example exchanger in FIG. 1 including fluid apertures according to one embodiment of the present disclosure.

As illustrated in FIG. 2, the exchanger 120 may include one or more fill tube bumpers 164 interposed between the fill tube 160 and the floor 112 of the pool 100 (see also FIG. 1). Additionally, the exchanger 120 may include one or more extension arm bumpers 144 interposed between one or more of the exchanger arms 140 and the pool floor. The bumpers 144 and 164 may be embodied as foam, rubber, etc., and may wrap around a portion or entire outer surface of the exchanger arms 140 and/or the fill tube 160. Generally, the bumpers 144 and 164 may be relied upon to help prevent the exchanger arms 140 and/or the fill tube 160 from wearing, rubbing, cutting or tearing the liner of the pool 100. Additionally, although not illustrated, the exchanger 120 may also include bumpers similar to the bumpers 144 and 164 interposed between one or more of the exchanger rings 150 and the floor 112 of the pool 100 (see also FIG. 1).

FIG. 2B illustrates a closer perspective view of an exchanger extension arm 140 of the example exchanger 120 in FIG. 1 including fluid apertures 170 according to one embodiment of the present disclosure. In FIG. 2B, the fluid apertures 170 in the exchanger extension arm 140 are more clearly shown. Generally, the fluid apertures 170 direct fluid from within the exchanger extension arm 140 into the pool 100. In this context, example jets 180 of fluid being directed upward into the pool 100 are illustrated in FIG. 2B. In one embodiment, the fluid apertures 170 may be embodied as holes from outside to an internal hollow center of the exchanger extension arm 140. The fluid apertures 170 may be formed by drilling or cutting holes in the exchanger extension arm 140, for example, or by any other suitable manner. In other embodiments, the fluid apertures 170 may be formed as venturi nozzles (or other types of nozzles or apertures) in or on the exchanger extension arm 140. In this case, the nozzles may help agitate or distribute fluid in the pool 100.

As shown, the fluid apertures 170 are formed inline and are spaced substantially evenly apart (e.g., uniformly apart) along the exchanger extension arm 140 at a 12 o'clock orientation. In other embodiments, however, the fluid apertures 170 may be formed at other orientations (e.g. at 8, 10, 2, or 4 o'clock orientations or combinations thereof) or staggered orientations and/or positions (e.g., non-uniformly) over the surface of the exchanger extension arm 140. For example, one or more of the fluid apertures 170 may be formed at various angles from the top or bottom of the exchanger extension arm 140. Fluid apertures 170 formed to direct fluid out toward the bottom of the exchanger extension arms 140 may be relied upon to stir or mix particles that may settle upon the pool floor 112. In other aspects of the embodiments, the exchanger extension arm 140 may include weep holes oriented toward the bottom to permit any remaining water to slowly drip out and prevent freezing, etc. It should also be appreciated that apertures similar to the fluid apertures 170 may be formed in any of the extension arms 140 and/or the exchanger rings 150 in the exchanger 120.

Figure 3:
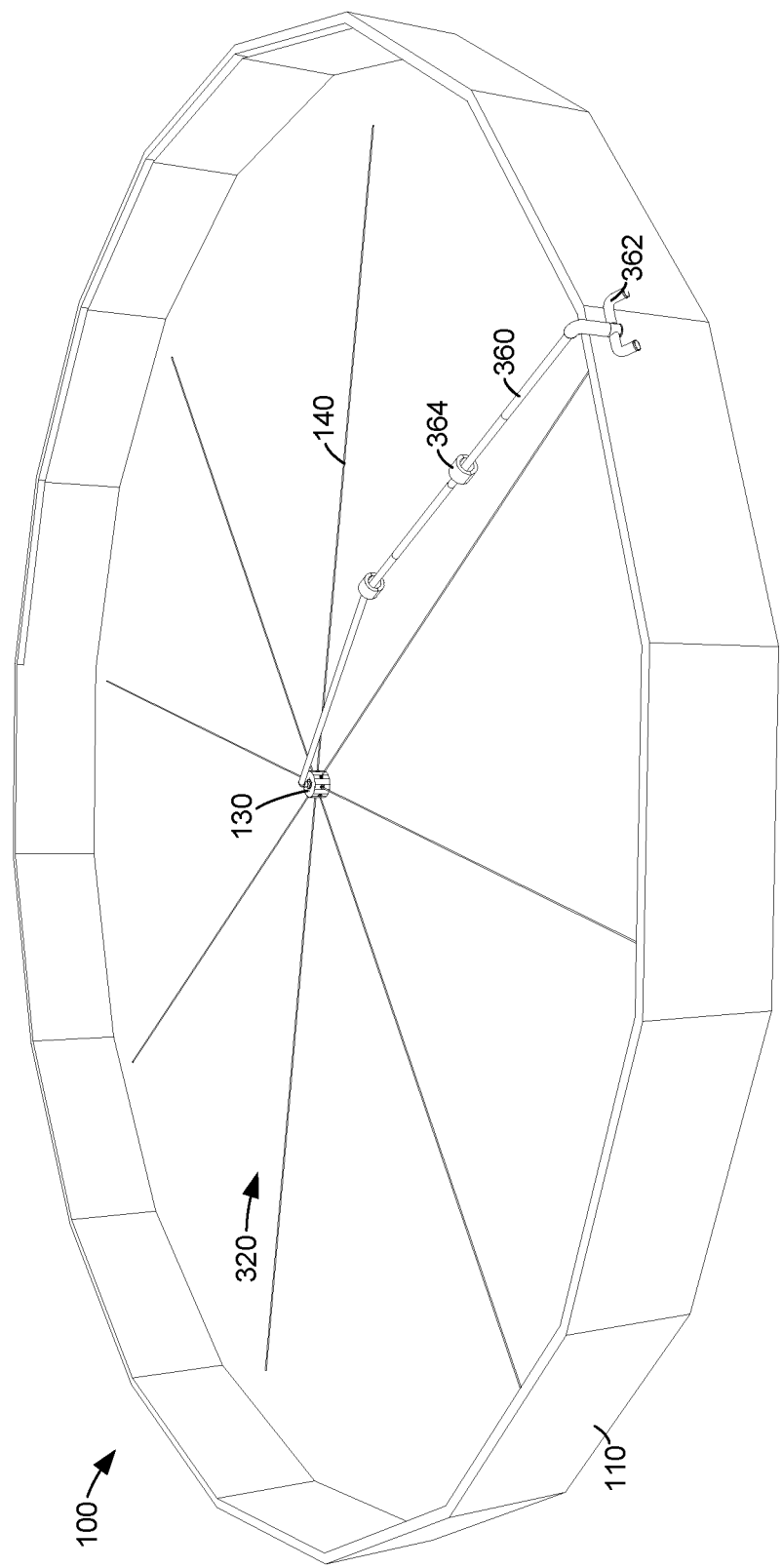
FIG. 3 illustrates a perspective view of the pool in FIG. 1 with another example exchanger according to one embodiment of the present disclosure.

FIG. 3 illustrates a perspective view of the pool 100 in FIG. 1 with another example exchanger 320 according to one embodiment of the present disclosure. As compared to the exchanger 120 in FIG. 1, the exchanger 320 includes the fill tube 360 rather than the fill tube 160, includes the snorkel 362 rather than the snorkel 162, and omits the exchanger rings 150. Rather than being routed along the pool floor 112, the fill tube 320 is routed along the surface of any fluid in the pool 100 before being connected to the fill tube inlet through the top of the diffuser hub 130. In this context, the exchanger 320 includes buoys 364 that hold the fill tube 360 up along the surface of any fluid in the pool 100. The snorkel 362 is similar to the snorkel 162 but does not curve as far into the interior fluid storage space of the pool 100 or extend as far down to the ground. In various embodiments, the snorkel 362 could extend as far down to the ground as is useful and practical for the operators.

FIGS. 4-11 illustrate a variety of views of a diffuser hub 400 according to one embodiment of the present disclosure. The diffuser hub 400 is an alternative embodiment of the diffuser hub 130 shown in FIGS. 1-3. The diffuser hub 400 includes a top 415, a bottom 903, a padded cover 412 surrounding a bottom side of the bottom 903, an inlet flange 403 attached to the top 415, one or more side walls 418 that surround an interior space formed between the top 415 and the bottom 903, one or more outlet reducers 406 extending from the one or more side walls 418, one or more outlet hoses 409 connected to the one or more outlet reducers 406, one or more diverters 603, a chamber 1006 formed by adjacent diverters 603, the top 415, the bottom 415, and one of the one or more side walls. The inlet flange 403 may be connected to the fill tube 160 to receive fluid into the diverter. One or more flanges may be on the one or more outlet hoses that may be relied upon to secure the heat exchanger arms in fluid communication with the interior space of the diffuser hub. In another embodiment, the one or more outlet houses may function as heat exchanger arms. In some embodiments, the diffuser hub 400 may comprise a type of pressure vessel. In one embodiment, the reducer may reduce in diameter from 6 inches to 4 inches. In another embodiment, the inlet flange may have a diameter of 8 inches. In yet another embodiment, the number of one or more outlet hoses 409 may be 8.

The diffuser hub 400 may be formed or constructed from any suitable material, such as metal, plastic, or any other material suitable for the application of holding and directing fluid at specified temperatures. In one embodiment, a side wall of the one or more side walls 418 may comprise a substantially vertical plane having a hole passing through. The plane may have a first tab 606/606B and a second tab 609/609B on the outside edges of the horizontal plane, as shown in the various figures. A first tab 606 may be placed over a second tab 609B of an adjacent side wall located on a first side of the side wall, and the second tab 609 may be placed under the first tab 606B of a second adjacent side wall. Each of the tabs may have one or more holes configured to accept a fastening device, such as a bolt or a rivet. The tabs may also be welded together, or fastened in any other known method. In an alternative embodiment, the side wall may comprise a single multi-sided cylindrical-shaped side wall. The single cylindrical side wall may have one or more angular sections and one or more planar sections. The single cylindrical side wall may also have a first end and a second end that are fastened together similarly to how the tabs 606 and 609B are secured together. In one embodiment, the side wall may be 12 inches long vertically. Reducing the vertical length of the sidewall may reduce the volume of the one or more chambers, thereby reducing the amount of fluid residing in the one or more chambers. For example, if the fluid volume in the one of more chambers is reduced, the heat radiated into fluid surrounding the diffuser hub may be reduced.

The one or more outlet reducers 406 may be welding at a proximal end to the one or more side walls 418. In other embodiments, the one or more outlet reducers 406 may bolted or riveted at the proximal end to the one or more side walls. Similarly, the one or more outlet reducers may also be affixed to the one or more outlet hose in any manner described herein. For example, the various figures illustrate the reducers being affixed to the outlet houses via a flange. At a distal end, the outlet hose 409 may be supported by a bumper. The bumper may provide protection to the liner of pool 100.

The diffuser hub may also include one or more diverters 603. The diverters can be configured to separate incoming fluids passing through the inlet flange into the one or more chambers 1006 associated with the one or more outlet reducers. The diverter may have a ridge along the upper edge. The ridge may include two inclined plane sides that form an apex proximate to the top of the diffuser hub. In some embodiments, the ridge may extend from the proximal end of the diverter to the distal end of the diverter. In other embodiments, the ridge may extend from the proximal end of the diverter to an intersection point 1003 between inlet flange and the diverter. In other embodiments, the intersection point 1003 may be between the top and the diverter. The edge may be configured to provide for more efficient diversion of water into the chambers 1006. The diverters may provide a fluid proof seal thereby preventing water from passing among the chambers 1006. The fluid proof seal may be created by a gasket placed between the diverters 603 and the top 415 and/or bottom 903. In one embodiment, the side wall may be 12 inches long vertically.

The bottom 903 of the diffuser hub 400 may include a padded cover 412 configured to protect a liner of the pool 100. For example, when the diffuser hub is located within the pool, the padded cover 412 may reside between the liner of the pool 100 and the bottom 903 of the diffuser hub 400 to prevent the bottom 903 from damaging the liner. In some embodiments, the padded cover 412 may surround the bottom side of the bottom 412. In other embodiments, the padded cover 412 may be one or more pads on the bottom 903. The padded cover 412 may also insulate the diffuser hub 400. In one embodiment, an insulating cover may surround the entire diffuser hub 400 or may surround various parts of the diffuser hub.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A pond or pool heat exchanger or mixer, comprising:
    a pool comprising a pool wall and a pool floor that retain fluid;
    a heat exchanger that extends over at least a portion of the pool, the heat exchanger comprising:
        a diffuser hub located proximate to a center of the pool, the diffuser hub comprising an inlet and a plurality of outlets;
        a plurality of outlet reducers coupled to the plurality of outlets of the diffuser hub;
        a plurality of heat exchanger extension arms, each of the plurality of heat exchanger extension arms being connected to one of the plurality of outlet reducers and extending radially outward from the diffuser hub toward the pool wall;
        at least one heat exchanger ring that intersects with at least one of the plurality of heat exchanger extension arms, the plurality of heat exchanger arms and the at least one exchanger ring having a plurality of fluid apertures that direct fluid into the pool; and
        a fill tube that extends from the pool wall to the diffuser hub.

2. The pool heat exchanger of claim 1, wherein the diffuser hub comprises:
    a housing that surrounds an interior space;
    a fill tube inlet through a top of the housing; and
    a plurality of diverters within the interior space of the housing.

3. The pool heat exchanger of claim 2, wherein the fill tube is connected in fluid communication with the fill tube inlet and supplies fluid to the heat exchanger to be diffused into the pool.

4. The pool heat exchanger of claim 1, further comprising at least one extension arm bumper interposed between at least one of the plurality of heat exchanger arms and the pool floor.

5. The pool heat exchanger of claim 1, further comprising at least one fill tube bumper interposed between the fill tube and the floor of the pool.

6. The pool heat exchanger of claim 1, further comprising a snorkel that extends over the pool wall and supplies fluid to the fill tube.

7. An exchanger, comprising:
    a diffuser hub comprising an inlet and a plurality of outlets;
    a plurality of outlet reducers coupled to the plurality of outlets of the diffuser hub;
    a plurality of exchanger extension arms, each of the plurality of exchanger extension arms being connected to one of the plurality of outlet reducers and extending radially outward from the diffuser hub; and
    a fill tube that extends from a pool wall to the diffuser hub, wherein the diffuser hub comprises:
        a housing that surrounds an interior space;
        a fill tube inlet; and
        a plurality of diverters within the interior space of the housing.

8. The exchanger of claim 7, further comprising at least one exchanger ring that intersects with at least one of the plurality of exchanger extension arms.

9. The exchanger of claim 8, wherein the at least one exchanger ring includes a plurality of fluid apertures that direct fluid into the pool.

10. The exchanger of claim 7, wherein the fill tube is connected in fluid communication with the fill tube inlet and supplies fluid to the exchanger to be diffused into the pool.

11. A heat exchanger or mixer, comprising:
   a pool comprising a pool wall and a pool floor;
   a heat exchanger that extends over at least a portion of the pool, the heat exchanger comprising:
      a diffuser hub located proximate to a center of the pool, the diffuser hub comprising an inlet and a plurality of outlets;
      a plurality of outlet reducers coupled to the plurality of outlets of the diffuser hub;
      a plurality of heat exchanger extension arms, each of the plurality of heat exchanger extension arms being connected to one of the plurality of outlet reducers and extending radially outward from the diffuser hub toward the pool wall;
      at least one heat exchanger ring that intersects with at least one of the plurality of heat exchanger extension arms, the plurality of heat exchanger arms and the at least one exchanger ring having a plurality of fluid apertures that direct fluid into the pool; and
      a fill tube that extends from the pool wall to the diffuser hub, wherein the diffuser hub comprises:
         a housing that surrounds an interior space;
         a fill tube inlet through a top of the housing; and
         a plurality of diverters within the interior space of the housing.

12. The heat exchanger of claim 11, wherein the fill tube is connected in fluid communication with the fill tube inlet and supplies fluid to the heat exchanger to be diffused into the pool.

13. The heat exchanger of claim 11, further comprising at least one extension arm bumper interposed between at least one of the plurality of heat exchanger arms and the pool floor.

14. The heat exchanger of claim 11, further comprising at least one fill tube bumper interposed between the fill tube and the floor of the pool.

15. The heat exchanger of claim 11, further comprising a snorkel that extends over the pool wall and supplies fluid to the fill tube.

* * * * *